Patented Aug. 14, 1923.

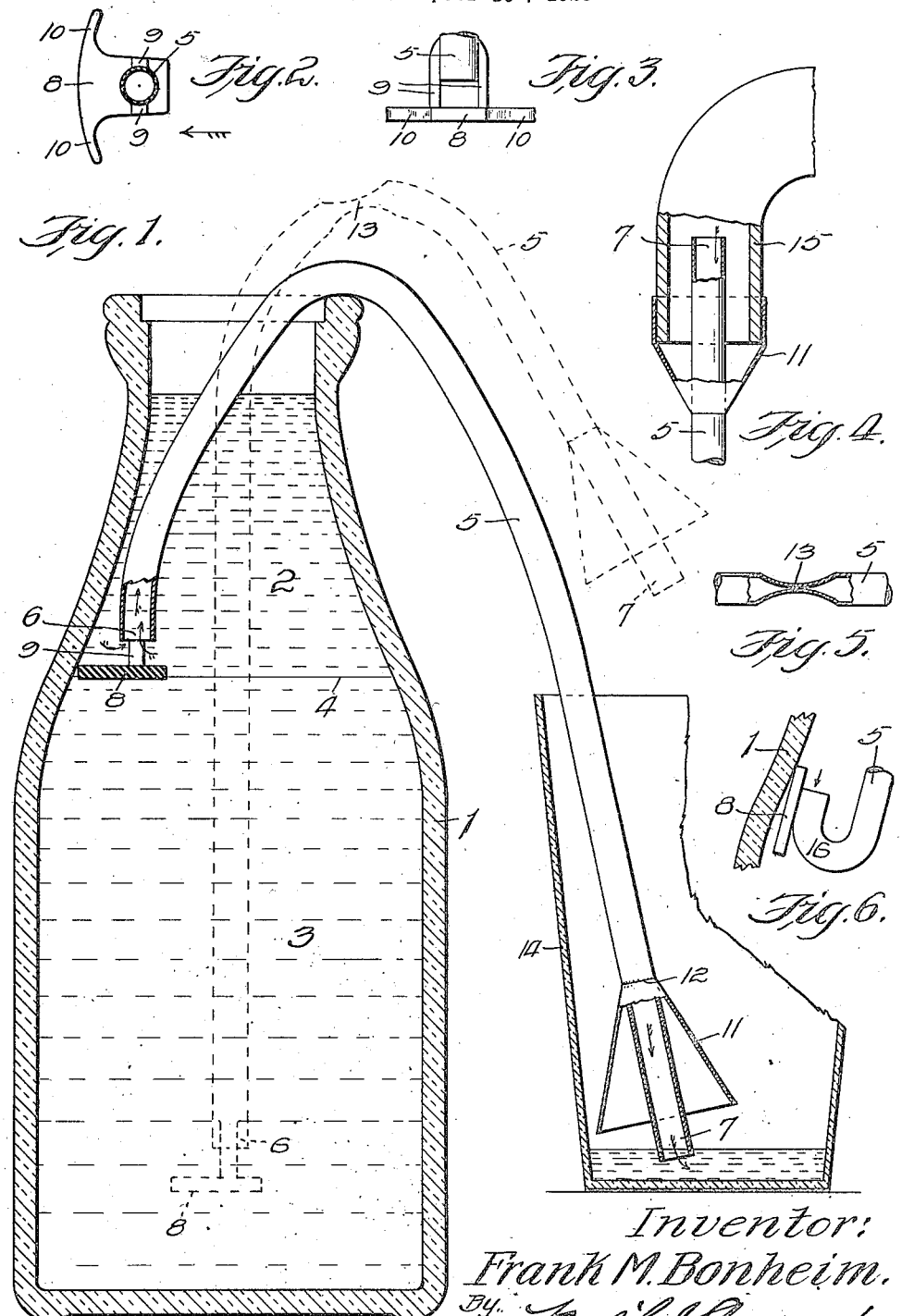

1,465,207

UNITED STATES PATENT OFFICE.

FRANK M. BONHEIM, OF ST. LOUIS, MISSOURI.

SIPHONING DEVICE.

Application filed April 30, 1920. Serial No. 377,852.

*To all whom it may concern:*

Be it known that I, FRANK M. BONHEIM, a citizen of the United States, residing in the city of St. Louis and State of Missouri, have invented a new and useful Siphoning Device, of which the following is a specification.

My invention relates to a siphon, and, more particularly to a siphoning device for household use in separating, by siphoning the cream at the top of a milk bottle from the milk in the lower part of the bottle, and, has for its object the provision of a simple device to overcome certain practical objections to, and defects in, the present style of siphoning devices utilized for like purposes.

A further object of the invention is the provision of an indicator at the inlet end of a rubber tube and an elastic rubber cup at the outlet end of the siphon tube, which cup is adapted to be slipped over a hot water faucet so that hot water can be forced through the tube, after use, for cleansing the tube by the force or pressure of the water passing through the tube.

A further object of the invention is the provision of a soft rubber tube of such diameter so that it may be readily squeezed together near the outlet end after being inserted into the milk in a bottle, and just prior to raising the inlet end to an elevation at the dividing line between the cream and milk, thereby creating a vacuum for holding the milk in the tube while withdrawing the tube so as to cause the cream to automatically flow through the tube when finger pressure has been relieved upon the tube.

A still further object of the invention is to provide a device of the class stated, which will consist of a unit, or one piece, thereby eliminating unnecessary detachable connections and attachments, such as pressure bulbs, cups and the like elements.

With the above and other objects in view, the invention consists in the novel features of construction, arrangement and combination of parts hereinafter fully described and finally pointed out in the claim hereto appended.

Referring to the accompanying drawings forming a part of this specification wherein like characters of reference denote similar parts throughout the several views:

Fig. 1, is a side elevation of a vacuum siphoning device, partly in section, embodying my invention and shown in full lines as in use in a milk bottle, and in dotted lines as initially inserted into the milk bottle before being squeezed and partially withdrawn to bring the indicator to an elevation at the bottom of the cream line prior to siphoning the cream from the milk.

Fig. 2, is a sectional view taken just above the indicator, which indicator also serves as a stop wall to prevent the upward movement of milk into the siphon tube.

Fig. 3, is a side elevation of the indicator looking in direction of arrow in Fig. 2.

Fig. 4, is a detail, partly in section and partly in elevation, of the outlet end of the siphon device as applied to a faucet for cleansing the tube after use.

Fig. 5, is a detail showing the tube as it appears when being squeezed to create a vacuum to hold the liquid in the tube as it is being partially withdrawn to automatically start the flow of liquid through the tube.

Fig. 6, is a view illustrating a modified form of the liquid inlet end of the siphon tube.

Referring to the drawings, the reference character 1 indicates an ordinary standard commercial milk bottle having the open upper end. 2 indicates the cream body; 3, the milk body, and 4, the dividing line between the body of cream and the body of milk.

In carrying out the aim of my present invention, I employ a suitable rubber, or elastic tube 5 of any desired length, or diameter, said tube having the open inlet end 6 and the open outlet, or discharge end 7.

A flat, preferably rubber indicator 8 is arranged a suitable distance below the inlet end 6 of the tube 5 and connected to the inlet end of the tube by means of a pair of suitable rubber legs 9 which are vulcanized at their lower ends to the indicator 8 and at their upper ends to the tube 5. The indicator 8 is provided at one end with opposed lateral extending wings 10, so that the position of the indicator can be readily observed through the glass bottle due to the fact that the indicator at this end will engage the glass bottle when the tube is in its siphon position, as illustrated in full lines in Fig. 1, owing to the flexibility of the tube 5, as is manifest.

An elastic cup shaped, or tapered body 11 is vulcanized at its small end 12 to the outlet end of the tube 5. The outlet end of the tube passes through the elastic cup 11 and projects a suitable distance beyond the wide end thereof, as clearly shown in Figs. 1 and 4.

The method of using the siphon is as follows:

The siphon tube 5 is first inserted into the liquid in the bottle 1, as shown in dotted lines in Fig. 1, so as to partially fill the tube with liquid, then the tube is squeezed together, by means of the fingers, as at 13, to hold the liquid in the tube 5 while the same is being withdrawn to the position shown in full lines in Fig. 1. When the tube has reached this position, which is gauged by the indicator 8, finger pressure is released upon the tube 5 and the cream will instantaneously start to flow into the tube through the inlet end 6 and be discharged through the outlet end 7. The cream may be discharged into any suitable receptacle 14, as is manifest.

It will be observed that by retaining the liquid in the tube 5 by pressing the walls of the tube together, as at 13 until the outlet end 7 has been moved to a position below the indicator 8, as shown, that the liquid entering the tube 5 as it is initially inserted into the bottle will immediately start to flow out of the tube thereby automatically siphoning the cream from the milk without disturbing or discharging the milk therewith.

It will be noticed that the indicator 8 also serves as a baffle plate adjacent the inlet end 6 of the tube 5 so that the milk will not be drawn into the tube even after all of the cream has been siphoned from the bottle.

The method of cleansing the tube after it has been used is as follows:

The elastic cup 11 fixed to the outlet end of the tube 5 is slipped over a faucet 15 which permits the outlet end of the tube to enter the faucet, as shown in Fig. 4. After the cup has been applied to the faucet the water is turned on. It will be observed, that the water will flow through the tube 5 and, if hot cleans the same interiorly owing to the pressure and force of the water passing through the tube, as is manifest. It is, of course, preferable to use hot water for the cleansing of the tube, and, as it is not necessary to hold the tube in connection with the faucet by hand, extremely hot water is permitted to pass through the same without having to burn the hands. Other methods of cleansing the tube can be used, such as placing the tube in hot water, but the method of attaching same to a hot water faucet has been found to be the most practical for cleansing the interior of the tube.

Referring to the modified form of inlet end for the tube 5, as shown in Fig. 6, it will be observed, that I form an inverted goose neck, designated 16, which retains this shape so that the cream, instead of being siphoned directly upward into the tube 5, as shown in Fig. 1, the cream will first flow downwardly into the goose neck 16 and then flow upward through the siphon tube 5. This form of inlet end for the tube 5 is also provided with the same form of indicator 8 as is fixed to the inlet end of the tube shown in Fig. 1, excepting that the indicator lies in a substantially vertical position for engagement with the inner wall of the bottle instead of lying horizontally, or at a right angle to the tube 5, as shown in Fig. 1.

The many advantages of the herein described invention will readily suggest themselves to those skilled in the art to which it appertains.

I do not wish to be understood as having limited myself to the specific details of construction shown and described, but desire to have it understood that the invention I have shown in the drawings, is merely illustrative, as it is manifest that various minor changes may be made in the exact construction and particular arrangement of several parts without departing from the spirit of my invention, hence I reserve the right to make any such changes, or modifications as may fairly fall within the scope of the appended claim when fairly construed.

What I claim is:

In combination with a flexible rubber tube, of a cup shaped flexible rubber faucet engaging member fixed at one end to the tube near one end thereof and in such a manner that the tube passes through said member and beyond the free edge thereof, a shield fixed to and below the opposite end of said tube and opposed laterally extending fingers formed at one end of the shield to serve as indicating means.

In testimony whereof, I have hereunto signed my name to the specification.

FRANK M. BONHEIM.